(12) United States Patent
Liu

(10) Patent No.: US 12,042,737 B2
(45) Date of Patent: Jul. 23, 2024

(54) IMAGE DISPLAY METHOD AND APPARATUS, STORAGE MEDIUM, AND ELECTRONIC DEVICE

(71) Applicant: TENCENT TECHNOLOGY (SHENZHEN) COMPANY LIMITED, Guangdong (CN)

(72) Inventor: Zhihong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 209 days.

(21) Appl. No.: 17/669,545

(22) Filed: Feb. 11, 2022

(65) Prior Publication Data
US 2022/0161144 A1 May 26, 2022

Related U.S. Application Data

(63) Continuation of application No. PCT/CN2020/123645, filed on Oct. 26, 2020.

(30) Foreign Application Priority Data

Jan. 23, 2020 (CN) .................. 202010076978.1

(51) Int. Cl.
*A63F 13/837* (2014.01)
*A63F 13/52* (2014.01)
(Continued)

(52) U.S. Cl.
CPC .......... *A63F 13/837* (2014.09); *A63F 13/52* (2014.09); *A63F 13/92* (2014.09); *G06F 3/0482* (2013.01)

(58) Field of Classification Search
CPC .... A63F 13/20; A63F 13/2145; A63F 13/219; A63F 13/40; A63F 13/426; A63F 13/48;
(Continued)

(56) References Cited

U.S. PATENT DOCUMENTS

2007/0213107 A1 9/2007 Itou et al.
2013/0196767 A1* 8/2013 Garvin .................. A63F 13/422
463/36
(Continued)

FOREIGN PATENT DOCUMENTS

CN 105498208 A 4/2016
CN 105893555 A 8/2016
(Continued)

OTHER PUBLICATIONS

International Search Report of PCT/CN2020/123645 dated Jan. 27, 2021 [PCT/ISA/210].
(Continued)

*Primary Examiner* — Omkar A Deodhar
(74) *Attorney, Agent, or Firm* — Sughrue Mion, PLLC

(57) ABSTRACT

This application discloses an image display method and apparatus, a storage medium, and an electronic device. The method includes: displaying identifiers of a set of images in a game screen of a target game application, obtaining a first operation directed to selecting an identifier of a first image from among the identifiers of the set of images, selecting an identifier of the first image in response to the first operation, and displaying the selected image on a first region of the game screen.

20 Claims, 5 Drawing Sheets

(51) Int. Cl.
*A63F 13/92* (2014.01)
*G06F 3/0482* (2013.01)

(58) Field of Classification Search
CPC ...... A63F 13/50; A63F 13/52; A63F 13/5255;
A63F 13/5258; A63F 13/53; A63F
13/537; A63F 13/5375; A63F 13/55;
A63F 13/56; A63F 13/577; A63F 13/58;
A63F 13/67; A63F 13/70; A63F 13/822;
A63F 13/837; A63F 13/92
See application file for complete search history.

(56) References Cited

U.S. PATENT DOCUMENTS

| 2016/0158641 | A1* | 6/2016 | Summons | A63F 13/219 |
| | | | | 463/31 |
| 2019/0091581 | A1* | 3/2019 | Reiche, III | A63F 13/798 |
| 2020/0298123 | A1 | 9/2020 | Yang et al. | |
| 2020/0406142 | A1 | 12/2020 | Qiu et al. | |

FOREIGN PATENT DOCUMENTS

| CN | 109045695 A | 12/2018 |
| CN | 109663354 A | 4/2019 |
| CN | 111318014 A | 6/2020 |
| JP | 2000-113206 A | 4/2000 |
| JP | 2004-181055 A | 7/2004 |
| JP | 2007-29222 A | 2/2007 |
| WO | 2019/201007 A1 | 10/2019 |

OTHER PUBLICATIONS

Written Opinion of PCT/CN2020/123645 dated Jan. 27, 2021 [PCT/ISA/237].
Japanese Office Action dated May 16, 2023 in Japanese Application No. 2022-523515.
Translation of Written Opinion of the International Searching Authority dated Jan. 27, 2021 in International Application No. PCT/CN2020/123645.
Extended European Search Report dated Oct. 12, 2022 in European Application No. 20915113.3.

* cited by examiner

IMAGE DISPLAY METHOD AND APPARATUS, STORAGE MEDIUM, AND ELECTRONIC DEVICE

CROSS-REFERENCE TO RELATED APPLICATION(S)

This application is a continuation application of PCT/CN2020/123645, filed Oct. 26, 2020, which claims priority to Chinese Patent Application No. 202010076978.1, filed with the China National Intellectual Property Administration on Jan. 23, 2020, the disclosures of which are incorporated by reference in their entireties.

FIELD

Embodiments of the present disclosure relate to the field of computer technologies, and in particular, to an image display method and apparatus, a storage medium, and a computer device.

BACKGROUND

In mobile shooting games, in order to attract more players, more and more social play modes will be introduced to the game in addition to normal combat modes. However, in a game scene, all scene elements are preset, and players cannot change the scene elements, that is, the scene elements in the game scene are fixed and cannot be changed. The inability to change scene elements limits the gaming experience of the players to a certain degree. Thus, the related art has the problem of poor diversity of the game scene elements.

SUMMARY

The present disclosure provides an image display method and apparatus, a storage medium, and an electronic device that to improve the diversity of picture display within a game scene in a game application and increase the diversity of game scene elements.

According to example embodiments of the present disclosure, a method of displaying an image in an application is provided, the method including: displaying identifiers of a set of images in a game screen of a target game application, the set of images being images configured for a target virtual operation object and to be displayed in the game screen; obtaining a first operation in the target game application, the first operation being used for selecting an identifier of a first image among the identifiers of the set of images; and displaying the first image on a first region of the game screen.

Embodiments of the present disclosure further provide an image display apparatus, including: at least one memory configured to store program code; and at least one processor configured to read the program code and operate as instructed by the program code, the program code includes: first displaying code configured to cause the at least one processor to display identifiers of a set of images in a game screen of a target game application, the set of images being images configured for a target virtual operation object and to be displayed in the game screen; first obtaining code configured to cause the at least one processor to obtain a first operation in the target game application, the first operation being used for selecting an identifier of a first image among the identifiers of the set of images; and second displaying code configured to cause the at least one processor to display the first image on a first region of the game screen.

The embodiments of the present disclosure include a non-transitory computer-readable storage medium, storing a computer program, the computer program being executable by at least one processor to perform the an image display method including: displaying identifiers of a set of images in a game screen of a target game application, the set of images being images configured for a target virtual operation object and to be displayed in the game screen; obtaining a first operation in the target game application, the first operation being used for selecting an identifier of a first image among the identifiers of the set of images; and displaying the first image on a first region of the game screen.

The embodiments of the present disclosure further provide an electronic device, including a memory, a processor, and a computer program stored in the memory and executable on the processor, the processor performing the image display method by using the computer program.

Embodiments of the present disclosure provide for configuration of a set of images for the target virtual object, increasing the flexibility of images that the target virtual object is allowed to display in the target game application. The target virtual object is no longer limited to displaying preset fixed images in the target game application, but can choose from more different images to be displayed on the first region, consequently increasing the diversity of the image display in a game scene and increasing the diversity of game scene elements.

BRIEF DESCRIPTION OF THE DRAWINGS

The accompanying drawings described herein are used for providing an understanding of the present disclosure, and form part of the present disclosure. Exemplary embodiments of the present disclosure and descriptions thereof are used for explaining the present disclosure, and do not constitute any inappropriate limitation to the present disclosure. In the accompanying drawings.

DETAILED DESCRIPTION

In order to make a person skilled in the art better understand the solutions of the present disclosure, the following clearly and completely describes the technical solutions in the embodiments of the present disclosure with reference to the accompanying drawings in the embodiments of the present disclosure. As will be apparent, the described embodiments are only some of the embodiments of the present disclosure rather than all of the embodiments. All other embodiments obtained by a person of ordinary skill in the art based on the embodiments of the present disclosure without creative efforts shall fall within the protection scope of the present disclosure.

In this specification, claims, and accompanying drawings of the present disclosure, the terms "first", "second", and so on are intended to distinguish similar objects but do not necessarily indicate a specific order or sequence. It is to be understood that the data termed in such a way are interchangeable in appropriate circumstances, so that the embodiments of the present disclosure described herein can be implemented in orders other than the order illustrated or described herein. Moreover, the terms "include", "contain" and any other variants mean to cover the non-exclusive inclusion, for example, a process, method, system, product, or device that includes a list of steps, operations, or units is not necessarily limited to those expressly listed steps, operations, or units, but may include other steps, operations, or units not expressly listed or inherent to such a process, method, system, product, or device.

Figure 1:
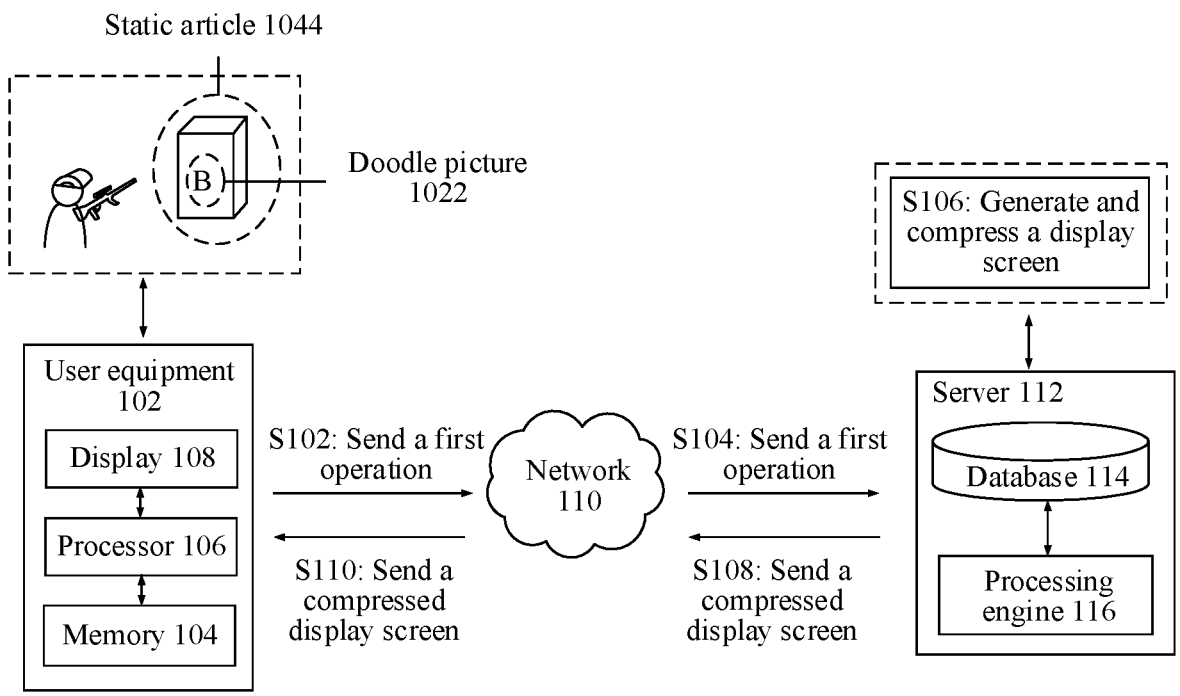
FIG. 1 is a schematic diagram of an application environment of an image display method according to an embodiment of the present disclosure.

The embodiment of the present disclosure provides an image display method. The image display method may be, but is not limited to, applicable to a game system in a hardware environment as shown in FIG. 1, where the game system may include, but is not limited to, a user equipment 102, a network 110, and a game application server 112. A client of a target game application (game client as shown in FIG. 1) runs in the user equipment 102, and the target game application runs in the game application server 112 and displays a game scene screen within a third-person visual range of a target virtual operation object through the user equipment 102. The user equipment may include, but is not limited to: a display 108, a processor 106 and a memory 104. The display 108 displays a game screen of a target game application, which may include, but is not limited to, displaying a doodle picture 1022 "B" (first image) on a static article 1044 (first region) in the target game application; the processor 106 is configured to obtain related information about the doodle picture 1022 "B" and the static article 1044 in response to a first operation, and perform matching processing on the information, the matching processing being used for determining to display the doodle picture 1022 "B" on the static article 1044 in the target game application, and for processing a compressed display screen in which the doodle picture 1022 "B" is displayed on the static article 1044 in the target game application. The memory 104 is configured to store the doodle picture 1022 "B" on the static article 1044 in the target game application. The server 112 herein may include, but is not limited to, a database 114 and a processing engine 116. The processing engine 116 is configured to call regional location information, model information, information about the doodle picture 1022, or the like, of all the scenes stored in the database 114, and is also configured to compress the screen in which the loaded doodle picture 1022 "B" is displayed on the static article 1044 in the target game application during an operation process and send the compressed screen to the user equipment 102 for presentation.

Referring to operations S102-S110, in the game scene screen presented by the display 108 in the user equipment 102 and within the third-person visual range of the target virtual operation object, identifiers (not shown in the figures) of a set of images are displayed in the target game application, and when a first operation is detected (for example, the identifier of the doodle picture 1022 "B" is selected for operation), the user equipment 102 performs operations S102-S104, that is, sends a first operation to the server 112 through the network 110. After receiving the first operation, the game application server 112 performs operation S106 to generate and compress a display screen according to the first operation, for example, generating a screen in which the doodle picture 1022 "B" is displayed on the static article 1044 in the target game application, and performs operations S108-S110 after compression, to send the compressed display screen to the user equipment 102 through the network 110.

In some embodiments, the image display method may be, but is not limited to, applicable to the user equipment. The user equipment or terminal device may be, but is not limited to, a terminal device that can run application clients, such as a mobile phone, a tablet computer, a notebook computer, a PC, or the like. The server and the user equipment may perform, but are not limited to, data exchange with each other through a network, and the network may include, but is not limited to, a wireless network or a wired network. The wireless network includes: Bluetooth, Wi-Fi, and another network implementing wireless communication. The wired network may include, but is not limited to: a wide area network, a metropolitan area network, and a local area network. These are merely examples, and this are not intended as limitations of the present disclosure.

Figure 2:
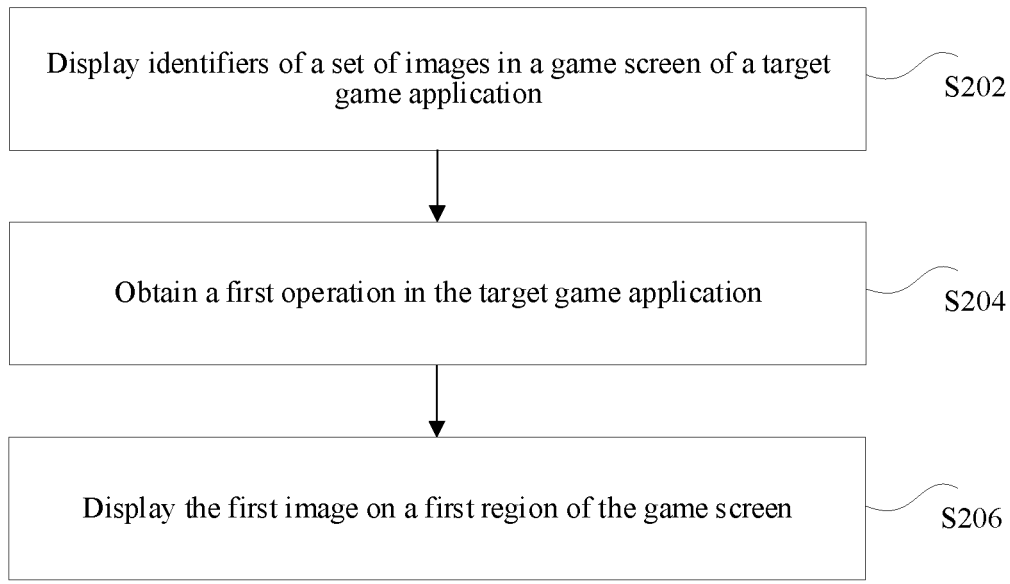
FIG. 2 is a schematic flowchart of an image display method according to an embodiment of the present disclosure.

In some embodiments, as shown in FIG. 2, the above-mentioned image display method includes the following operations S202-S206:

S202: Display identifiers of a set of images in a game screen of a target game application, the set of images being images configured for a target virtual operation object and to be displayed in the game screen.

S204: Obtain a first operation in the target game application, the first operation being used for selecting an identifier of a first image among the identifiers of the set of images.

S206: Display the first image on a first region of the game screen.

In some embodiments, the image display method described above may be, but is not limited to, applicable to displaying a self-selected image in a specified region in the game screen of the target game application. In some implementations, the above target game may include, but is not limited to, a role-playing game (RPG), an action game (ACT), an adventure game (AVG), a shooting game, or the like. In some implementations, a shooting game may be, but is not limited to, a multiplayer online tactical battle arena (MOBA) application, or a single-player game (SPG) application. The type of the above-mentioned game application may include, but is not limited to, at least one of the following: a two-dimensional (2D) game application, a three-dimensional (3D) game application, a virtual reality (VR) game application, an augmented reality (AR) game application, and a mixed reality (MR) game application. The above-mentioned is merely an example, and this embodiment is not limited thereto. In addition, the virtual character in the target shooting game described above may be, but is not limited to, a character object controlled by a current player logging into the client of the shooting game application, where the shooting game application may be a third person shooting game (TPS) application. For example, the shooting game application is run from the perspective of a third-party character object other than the virtual character controlled by the current player. The shooting game application may alternatively be a first person shooting game (FPS) application. For example, the shooting game application is run from the perspective of the virtual character controlled by the current player.

In some embodiments, a set of images may include one or more identifiers, and the quantity of identifiers may be defined, but the present disclosure is not limited thereto. A set of images configured for the target virtual operation object may be configured in a preparation interface scene. The preparation interface may be, but is not limited to, a preparation stage interface after the target game is turned on, a preparation stage interface before the target game is turned on, such as a warehouse interface, a mall interface, a collection interface, or the like. The first operation may include, but is not limited to, a touch operation, a voice operation, a command operation, or the like, where the touch operation may include, but is not limited to, a touch in a specified region, a touch of specified duration, or the like. The first image may include, but is not limited to, an image drawn by a non-target virtual operation object, an image drawn by a target virtual operation object, or the like. The first region may include, but is not limited to, floors, walls, or other static articles (such as steps, static obstacles, etc.), or the like, where the static article may be, but is not limited to, an article that remains stationary for a plurality of frames in the game screen.

Identifiers of a set of images are displayed in a target game application, the set of images being images configured for a target virtual operation object and to be displayed in the target game application; a first operation is obtained in the target game application; in response to the first operation, an identifier of a first image is selected among the identifiers of the set of images, and finally the first image is displayed on a first region of the target game application. In some embodiments, displayed identifiers of a set of images may or may not be consistent with the set of images, or displayed identifiers of a set of images may or may not be consistent with the set of images after being reduced or enlarged.

Figure 3:
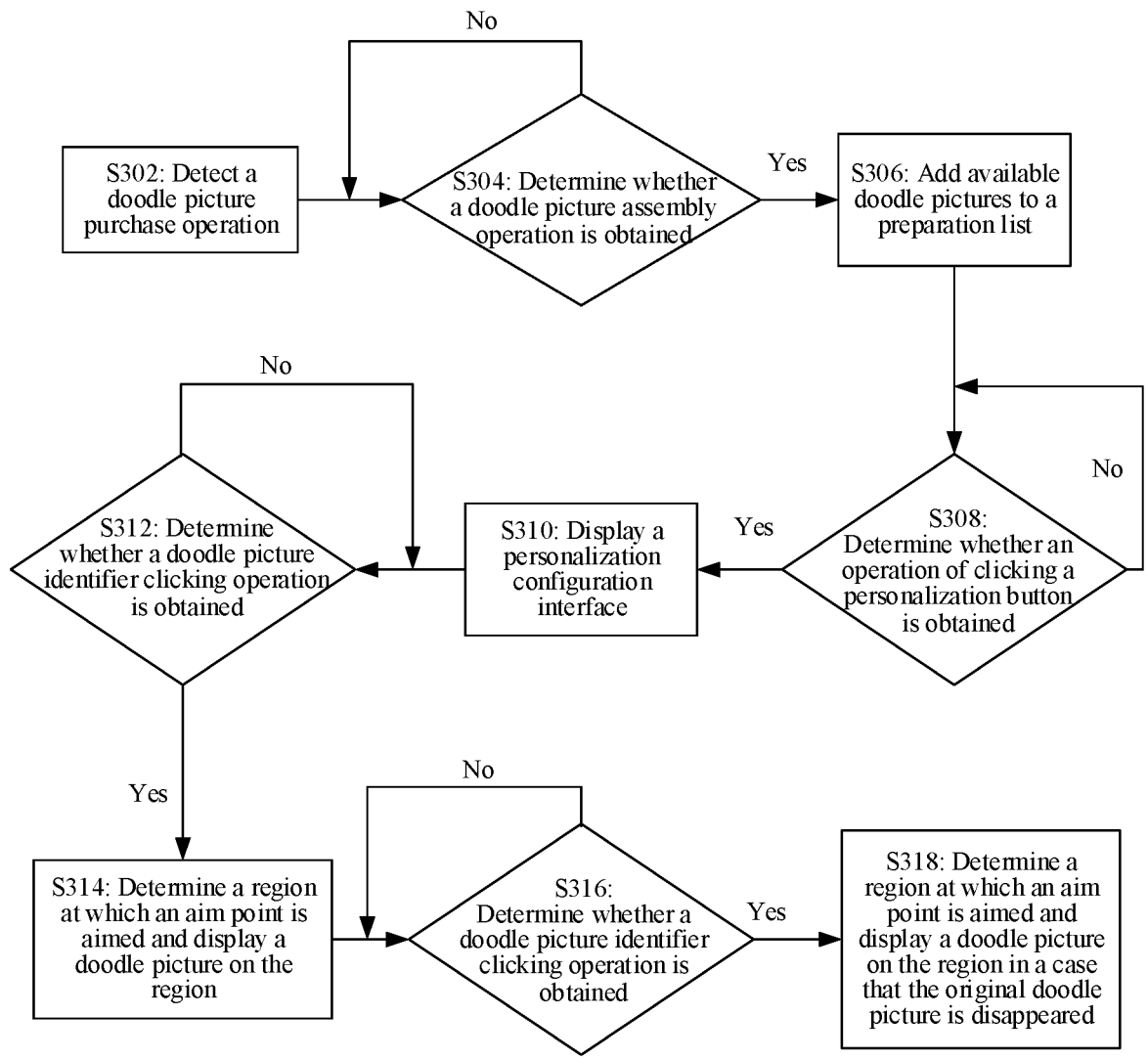
FIG. 3 is a schematic flowchart of an image display method according to an embodiment of the present disclosure.

In some embodiments, as shown in FIG. 3, the method may include operations S302-S318:

S302: Detect a doodle picture purchase operation.

In some embodiments, the purchase operation may be triggered in, but is not limited to, the mall interface.

S304: Determine whether a doodle picture assembly operation is obtained.

The determining is continued if the doodle picture assembly operation is not obtained, where the doodle picture assembly operation may be triggered in, but is not limited to, the preparation interface;

S306: Add available doodle pictures to a preparation list when the doodle picture assembly operation is obtained.

The preparation list may be used for, but is not limited to, displaying virtual props, virtual skills, or the like, that can be applied by the virtual operation object to the target game application scene, such as a warehouse, a preparation interface, or the like;

S308: Determine whether an operation of clicking a personalization button is obtained.

The determining continues if the operation of clicking the personalized button is not obtained, where the personalization button may be displayed on, but is not limited to, the game screen. The click operation may be, but is not limited to, a touch operation, and the operation of clicking the personalization button may be triggered in, but is not limited to, a game combat interface.

S310: Display a personalized assembly interface when the operation of clicking the personalization button is obtained.

The personalized assembly interface may display, but is not limited to, a plurality of identifiers of doodle pictures;

S312: Determine whether a doodle picture identifier clicking operation is obtained.

The determining continues if the doodle picture identifier clicking operation is not obtained.

S314: Determine a region at which an attack aim point of a virtual operation object is aimed, and display the doodle picture in the region when doodle picture identifier clicking operation is obtained.

S316: Determine whether a doodle picture identifier clicking operation is obtained.

The determining continues if the doodle picture identifier clicking operation is not obtained.

S318: Cancel the doodle picture in S314, re-determine a region at which the attack aim point of the virtual operation object is aimed, and display the doodle picture in the region when the doodle picture identifier clicking operation is obtained.

The region in S318 and the region in S314 may be different or identical regions; the doodle picture in S318 and the doodle picture in S314 may be different or identical doodle pictures.

In an example embodiment, identifiers of a set of images are displayed in a target game application, and a first operation is obtained in the target game application; then, in response to the first operation, an identifier of a first image is selected among the identifiers of the set of images, thereby displaying the first image on a first region of the target game application. That is, by configuring a set of images for the target virtual object, the flexibility of images that the target virtual object is allowed to display in the target game application increases. The target virtual object can display customized images in the target game application because the target virtual object is no longer limited to displaying preset fixed images in the target game application, but can choose from more different images to be displayed on the first region, consequently improving the image display diversity.

In some embodiments, the displaying a first image on a first region of a target game application includes:

displaying the first image on the first region at which a first aim point is aimed in the game screen, the first aim point being an aim point of a first virtual attack prop currently used by the target virtual operation object.

The first image is displayed on the first region at which the first aim point is aimed in the game screen, the first aim point being the aim point of the first virtual attack prop currently used by the target virtual operation object.

Figure 4:
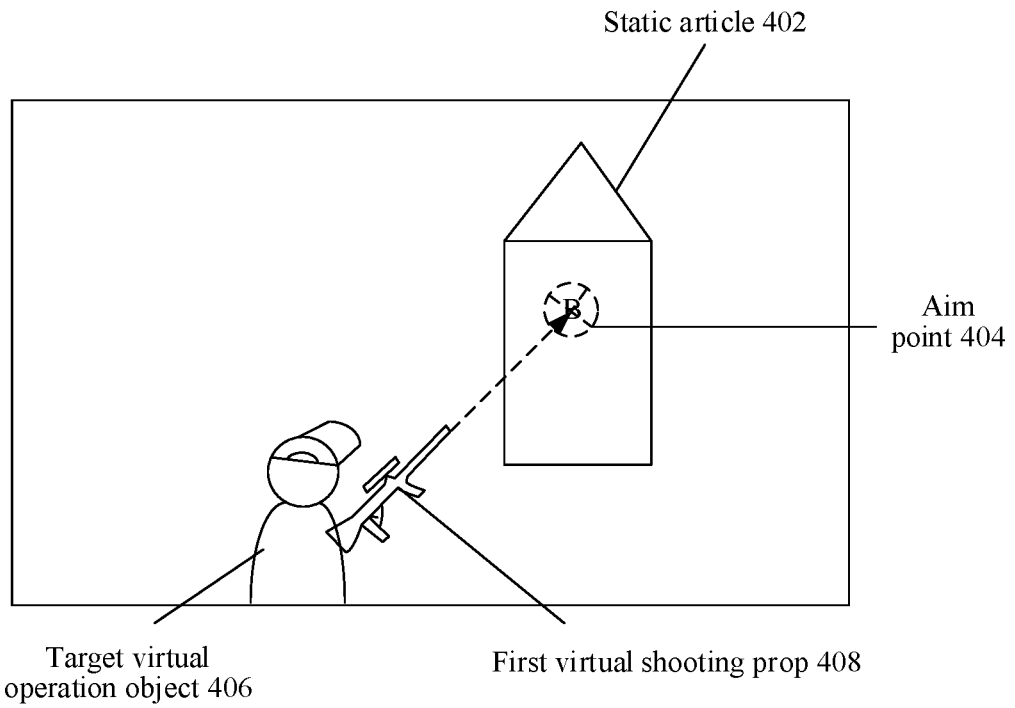
FIG. 4 is a schematic diagram of an image display method according to an embodiment of the present disclosure.

In some embodiments, as shown in FIG. 4, the target game application includes a static article 402, a target virtual operation object 406, and a first virtual attack prop 408 currently used by the target virtual operation object 406, where an aim point 404 of the first virtual attack prop 408 is displayed on a region of the static article 402, and further the doodle picture "B" (first picture) is displayed on the region, the region in which the doodle picture "B" is located may be, but is not limited to, a first region.

In an embodiment, the first image is displayed on the first region at which the first aim point is aimed in the game screen, so that the accuracy of displaying the first image is improved by determining the display region of the first image.

In some embodiments, the displaying the first image on the first region at which a first aim point is aimed in the game screen includes:

S1: Obtain a first location at which the first aim point is aimed, the first location being a location at which the first aim point and a first static obstacle in the target game application are aligned.

S2: Display the first image on the first region including the first location.

The first location at which the first aim point is aimed is obtained, and the first image is displayed on the first region including the first location. In some embodiments, the static obstacle may be, but is not limited to, a static article.

In some embodiments, as shown in FIG. 4, the first location is where the aim point 404 is located, and thus the doodle picture "B" (first image) is displayed where the aim point 404 is located, the region in which the doodle picture "B" is located may be, but is not limited to, the first region.

In some embodiments, as shown in FIG. 4, the doodle picture "B" (first image) is displayed at the location where the aim point 404 of the first virtual attack prop 408 being used by the target virtual operation object 406 and the static article 402 (the first region) are aligned.

For example, the first region may be, but is not limited to, displayed on the static article 402 with the aim point 404 of the first virtual attack prop 408 as a center, where the area of the first region may be, but is not limited to, smaller than the range of the display region of the static article 402.

In this embodiment, the first location at which the first aim point is aimed is obtained, and the first image is displayed on the first region including the first location, so that the accuracy of displaying the first image is improved by determining the display location of the first image.

In some embodiments, after the displaying a first image on a first region of a target game application, the method further includes:

S1: Display identifiers of a set of images in the game screen.

S2: Obtain a second operation in the target game application, the second operation being used for selecting an identifier of a second image among the identifiers of the set of images.

S3: Select, in response to the second operation, the identifier of the second image among the identifiers of the set of images.

S4: Display the second image on a second region of the game screen, and cancel the display of the first image on the first region of the target game application.

Identifiers of a set of images are displayed in a game screen, and a second operation is obtained in the target game application; in response to the second operation, an identifier of a second image is selected among the identifiers of the set of images; the second image is displayed on a second region of the game screen, and the display of the first image on the first region of the game screen is canceled. In some embodiments, the first image may be, but is not limited to, different from the second image. In some embodiments, the identifier of the image may be, but is not limited to, smaller than the size of the corresponding image to be displayed. The form of displaying identifiers of a set of images may be, but is not limited to, a circular list, a rectangular list, or the like.

Figure 5:
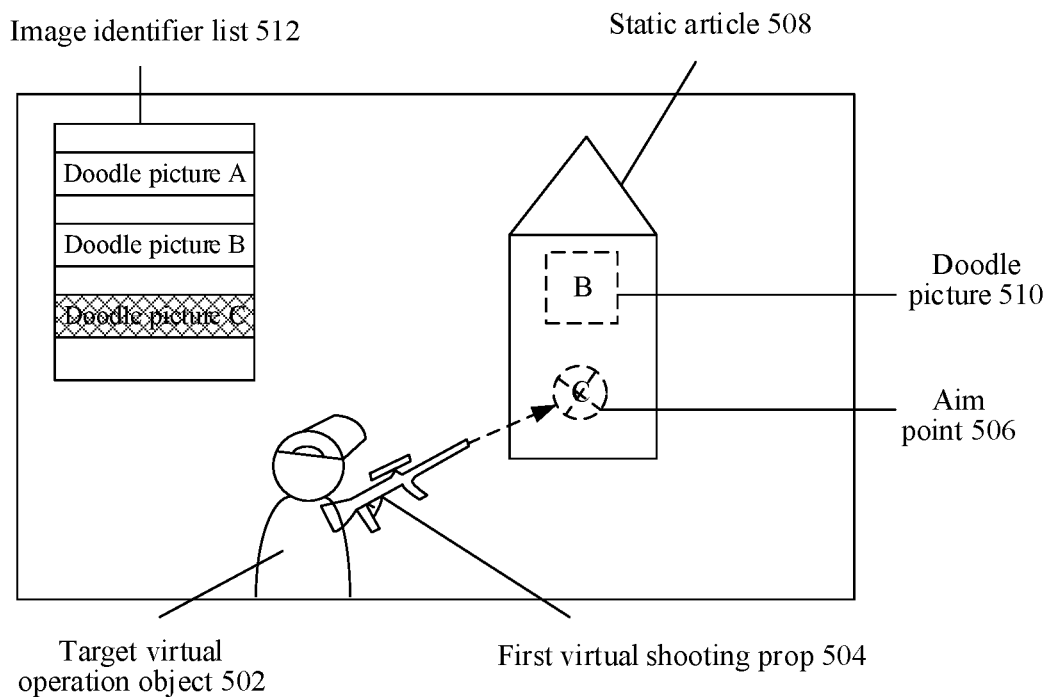
FIG. 5 is a schematic diagram of an image display method according to an embodiment of the present disclosure.

In some embodiments, as shown in FIG. 5, an image identifier list 512 is displayed in the game screen, where the image identifier list 512 includes identifiers of a set of images (doodle picture "A", doodle picture "B", and doodle picture "C"). In some embodiments, for example, when the identifier of the doodle picture "C" (the second image) is selected among identifiers of a set of images (the doodle picture "C" is in a selected state as shown in a shaded part of the figure), a second image (doodle picture "C") is displayed at a touch location where the aim point 506 of the first virtual shooting prop 504 currently used by the target virtual operation object 502 touches the static article 508, and the display of the doodle picture 510 (doodle picture "B") is canceled. In other words, simultaneous display of a plurality of images may be forbidden, but the present disclosure is not limited thereto.

In this embodiment, the second image is displayed on a second region of the target game application, and the display of the first image on the first region of the target game application is canceled. The quantity of images displayed simultaneously in the target game application is controlled, to avoid the interference with the operation of the target virtual object caused by a large quantity of images displayed. In addition, the quantity of images stored in the cache can be reduced to reduce the processing overhead for image display and avoid the problem of display lagging.

In some embodiments, the displaying the second image on a second region of the game screen includes:

displaying the second image on the second region at which a second aim point is aimed in the target game application, the second aim point being an aim point of a second virtual attack prop currently used by the target virtual operation object.

The second image is displayed on the second region at which the second aim point is aimed in the game screen.

In some embodiments, as shown in FIG. 5, the aim point 506 of the first virtual attack prop 504 is displayed on a region of the static article 508, and further the doodle picture "C" (second picture) is displayed on the region. The region in which the doodle picture "C" is located may be, but is not limited to, the second region.

In some embodiments, the displaying the second image on the second region at which a second aim point is aimed in the target game application includes:

obtaining a second location at which the second aim point is aimed, the second location being a touch location at which the second aim point touches a second static obstacle in the target game application; and displaying the second image on the second region including the second location.

The second location at which the second aim point is aimed is obtained and the second image is displayed on the second region including the second location.

In some embodiments, as shown in FIG. 5, the doodle picture "C" (second image) is displayed at the touch location where the aim point 506 of the first virtual attack prop 504 being used by the target virtual operation object 502 touches the static article 508 (second region).

In this embodiment, the second image is displayed on the second region including the second location, so that the accuracy of displaying the second image is improved by determining the display location of the second image.

In some embodiments, before the displaying identifiers of a set of images in the game screen, the method further includes:

S1: Display an image list on a configuration interface of the game screen, the image list including identifiers of a plurality of images;

S2: Obtain a third operation in the target game application, the third operation being used for selecting identifiers of a set of images among the identifiers of the plurality of images;

S3: Select, in response to the third operation, the identifiers of the set of images among the identifiers of the plurality of images, and configure the set of images for the target virtual operation object.

An image list is displayed in a configuration interface of the game screen; a third operation is obtained in the target game application; and in response to the third operation, identifiers of a set of images are selected among identifiers of a plurality of images, and the set of images is configured for the target virtual operation object. In some embodiments, the configuration interface may be, but is not limited to, displayed during a preparation stage, for example, displayed when the target game is not started. Examples where the target game is not started may include, but is not limited to, when the target game is entered but the target game does not display a combat interface. The configuration interface may be, but is not limited to, a warehouse interface, and may be displayed by triggering access to the configuration interface in the mall interface.

Figure 6:
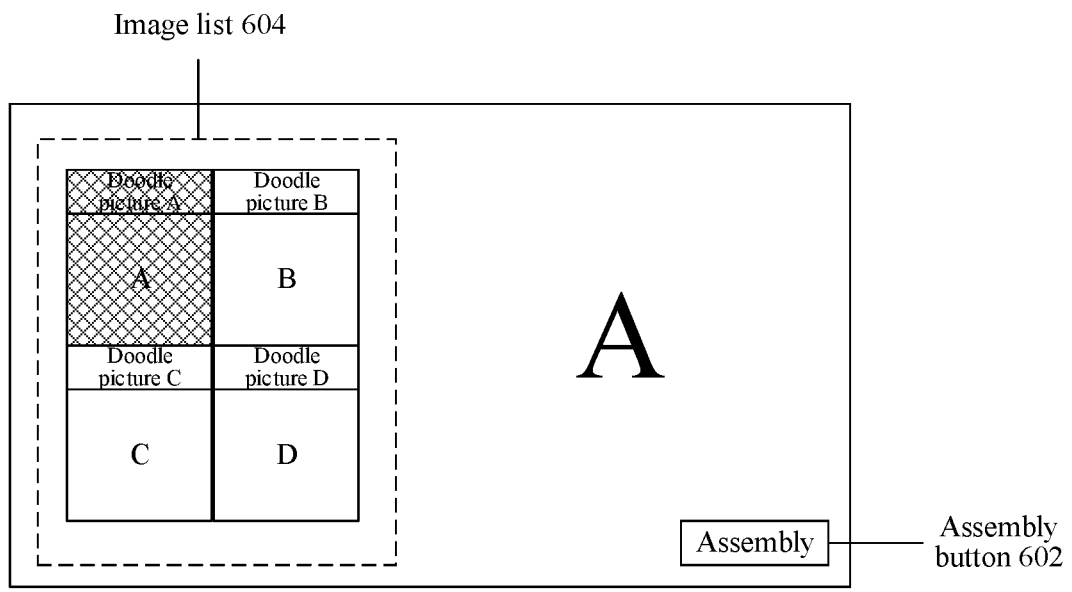
FIG. 6 is a schematic diagram of an image display method according to an embodiment of the present disclosure.

In some embodiments, as shown in FIG. 6, for example, an image list 604 and an assembly button 602 exist in the configuration interface in the game screen, and the image list 604 includes the image identifiers of the doodle picture "A", the doodle picture "B", the doodle picture "C", and doodle picture "D"; further, an operation of selecting the doodle picture "A" in the image list 604 (shown as a shaded part in the figure) is obtained. In some embodiments, the display effect of the doodle picture "A" is displayed on the right side of the image list 604; in some embodiments, the touch operation triggered on the assembly button 602 is detected and the doodle picture "A" is configured for the target virtual operation object.

In this embodiment, an image list is displayed on the configuration interface in the game screen, and a third operation is obtained in the target game application; identifiers of a set of images are selected among identifiers of a plurality of images in response to the third operation, and the set of images is configured for the target virtual operation object. A set of images is selected from the image list displayed on the configuration interface in the target game application and is configured for the target virtual operation object, thereby improving the display intuitiveness of the to-be-configured images.

For ease of description, the methods in the present disclosure are stated as a series of action combinations. However, a person skilled in the art is to learn that the present disclosure is not limited to the described sequence of the actions because according to the present disclosure, some operations may use another sequence or may be simultaneously performed. In addition, a person skilled in the art is also to understand that the embodiments described in this specification are all exemplary embodiments, and the involved actions and modules are not necessarily required to the present disclosure.

Figure 7:
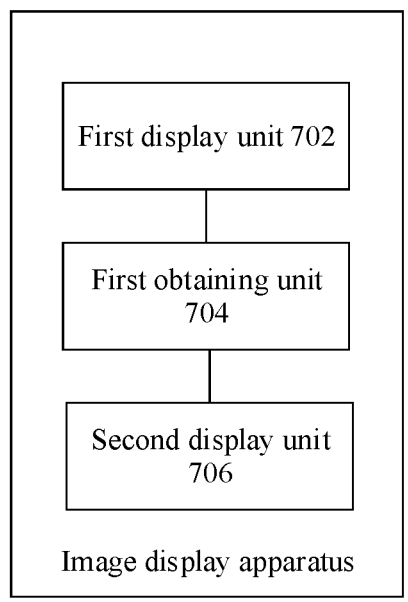
FIG. 7 is a schematic structural diagram of an image display apparatus according to an embodiment of the present disclosure.

An embodiment of the present disclosure further provides an image display apparatus for performing the image display methods. As shown in FIG. 7, the apparatus includes:

a first display unit 702, configured to display identifiers of a set of images in a game screen of a target game application, the set of images being images configured for a target virtual operation object and to be displayed in the game screen;

a first obtaining unit 704, configured to obtain a first operation in the target game application, the first operation being used for selecting an identifier of a first image among the identifiers of the set of images; and a second display unit 706, configured to display the first image on a first region of the game screen.

In some embodiments, the image display apparatus described above may be, but is not limited to, applicable to a scenario of displaying a self-selected image in a specified region in the target game application. In some embodiments, the above scenario may include, but is not limited to, a role-playing game (RPG), an action game (ACT), an adventure game (AVG), a shooting game, or the like. In some embodiments, the shooting game may be, but is not limited to, a multiplayer online tactical battle arena (MOBA) application, or a single-player game (SPG) application. These types of game applications may include, but is not limited to, at least one of the following: a two-dimensional (2D) game application, a three-dimensional (3D) game application, a virtual reality (VR) game application, an augmented reality (AR) game application, and a mixed reality (MR) game application. The above-mentioned applications is merely an example, and this embodiment is not limited thereto. In addition, the virtual character in the target shooting game described above may be, but is not limited to, a character object controlled by a current player logging into a client of the shooting game application, where the shooting game application may be a third person shooting game (TPS) application. For example, the shooting game application is run from the perspective of a third-party character object other than the virtual character controlled by the current player. The shooting game application may alternatively be a first person shooting game (FPS) application. For example, the shooting game application is run from the perspective of the virtual character controlled by the current player.

In some embodiments, a set of images may include one or more identifiers, and the quantity of identifiers may be defined, but the present disclosure is not limited thereto. A set of images configured for the target virtual operation object may be configured in a preparation interface scene, which is not limited in the present disclosure. The preparation interface may be, but is not limited to, a preparation stage interface after the target game is turned on, a preparation stage interface before the target game is turned on, such as a warehouse interface, a mall interface, a collection interface, or the like. The first operation may include, but is not limited to, a touch operation, a voice operation, a command operation, or the like, where the touch operation may include, but is not limited to, a touch in a specified region, a touch of specified duration, or the like. The first image may include, but is not limited to, an image drawn by a non-target virtual operation object, an image drawn by a target virtual operation object, or the like. The first region may include, but is not limited to, floors, walls, or other static articles (such as steps, ceilings, static obstacles, etc.), or the like.

Identifiers of a set of images are displayed in a game screen of a target game application, the set of images being images configured for a target virtual operation object and to be displayed in the game screen; a first operation is obtained in the target game application, and in response to the first operation, an identifier of a first image is selected among the identifiers of the set of images; finally, the first image is displayed on a first region of the game screen.

For specific embodiments, refer to the examples shown in the above method for operating virtual props. Details will not be described again in this example.

In this embodiment, identifiers of a set of images are displayed in a game screen of a target game application, and a first operation is obtained in the target game application; then, in response to the first operation, an identifier of a first image is selected among the identifiers of the set of images, thereby displaying the first image on a first region of the target game application. By displaying self-selected images in the target game application, it is possible to display both fixed images of scene elements in the game application as well as a variety of images configured specifically for the virtual operation object, consequently achieving the technical effect of increasing the diversity of image display.

In some embodiments, the second display unit 706 includes:
- a first display module, configured to display the first image on the first region at which a first aim point is aimed in the game screen, the first aim point being an aim point of a first virtual attack prop currently used by the target virtual operation object.

In some embodiments, the first display unit includes:
- a first obtaining submodule, configured to obtain a first location at which the first aim point is aimed, the first location being a touch location at which the first aim point and a first static obstacle in the target game application are aligned; and
- a first display submodule, configured to display the first image on the first region including the first location.

In some embodiments, the apparatus further includes:
- a third display unit, configured to display the identifiers of the set of images in the target game application after the first image is displayed on the first region of the game screen;
- a second obtaining unit, configured to obtain a second operation in the game screen after the first image is displayed on the first region in the game screen, the second operation being used for selecting an identifier of a second image among the identifiers of the set of images;
- a second response unit, configured to select, in response to the second operation, the identifier of the second image among the identifiers of the set of images; and
- a fourth display unit, configured to display the second image on a second region of the game screen, and cancel the display of the first image on the first region of the game screen.

In some embodiments, the fourth display unit includes:
- a second display module, configured to display the second image on the second region at which a second aim point is aimed in the game screen, the second aim point being an aim point of a second virtual attack prop currently used by the target virtual operation object.

In some embodiments, the second display unit includes:
- a second obtaining submodule, configured to obtain a second location at which the second aim point is aimed, the second location being a location at which the second aim point and a second static obstacle in the target game application are aligned; and
- a second obtaining subunit, configured to display the second image on the second region including the second location.

In some embodiments, the apparatus further includes:
- a fifth display unit, configured to display an image list on a configuration interface of the game screen before the identifiers of the set of images are displayed in the target game application, the image list including identifiers of a plurality of images;
- a third obtaining unit, configured to obtain a third operation in the target game application before identifiers of the set of images are displayed in the game screen, the third operation being used for selecting the identifiers of the set of images among the identifiers of the plurality of images; and
- a third response unit, configured to select the identifiers of the set of images among the identifier of the plurality of images in response to the third operation before the identifier of the set of images are displayed in the game screen, and configure the set of images for the target virtual operation object.

Figure 8:
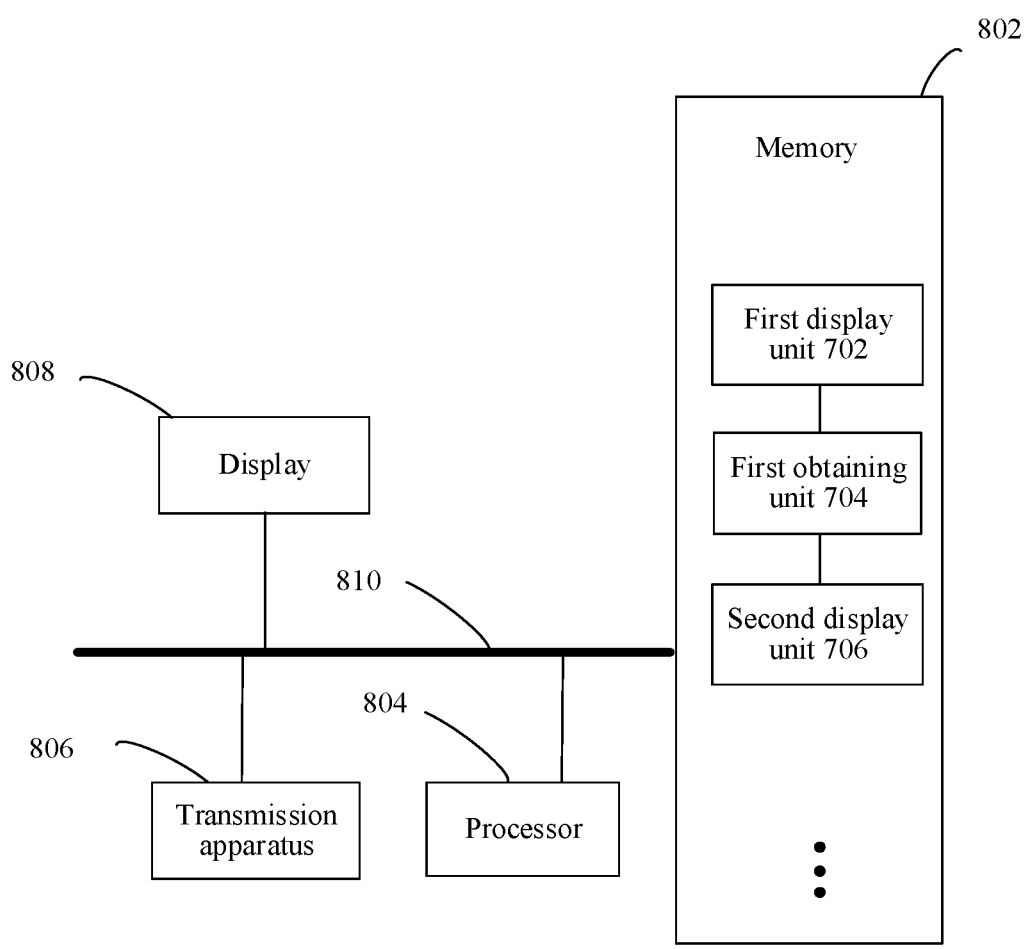
FIG. 8 is a schematic structural diagram of an electronic device according to an embodiment of the present disclosure.

Embodiments of the present application also provide an electronic device for implementing the image display method described above, and in actual implementation, the electronic device may be a terminal or a server. As shown in FIG. 8, the electronic device includes a memory 802 and a processor 804, the memory 802 storing a computer program, and the processor 804 is configured to execute, using the computer program, the image display method provided by embodiments of the present disclosure.

In some embodiments, the electronic device may be located in at least one of a plurality of network devices in a computer network.

In some embodiments, the above-mentioned processor may be configured to perform the following operations by using the computer program:
- S1: Display identifiers of a set of images in a game screen of a target game application, the set of images being images configured for a target virtual operation object and to be displayed in the game screen.
- S2: Obtain a first operation in the target game application, the first operation being used for selecting an identifier of a first image among the identifiers of the set of images.
- S3: Display the first image on a first region of the game screen.

A person of ordinary skill in the art may understand that, the structure shown in FIG. 8 is only schematic. The electronic device may be a user equipment such as a smartphone (such as an Android mobile phone or an iOS mobile phone), a tablet computer, a palmtop computer, a mobile Internet device (MID), or a PAD. FIG. 8 does not limit the structure of the electronic device. For example, the electronic device may further include more or fewer components (such as a network interface) than those shown in FIG. 8, or have a configuration different from that shown in FIG. 8.

The memory 802 may be configured to store a software program and module, for example, a program instruction/module corresponding to the image display method and apparatus in the embodiments of the present disclosure. The processor 804 runs the software program and module stored in the memory 802, to perform various functional applications and data processing, that is, implement the above-mentioned image display method. The memory 802 may include a high-speed random memory, and may also include a non-volatile memory, for example, one or more magnetic storage apparatuses, a flash memory, or another nonvolatile solid-state memory. In some embodiments, the memory 802 may further include memories remotely disposed relative to the processor 804, and the remote memories may be connected to a terminal through a network. Examples of the network include, but are not limited to, the Internet, an intranet, a local area network, a mobile communication network and a combination thereof. The memory 802 may be configured to, but is not limited to, store identifiers of a set of images, a first image, a first region, or other information. As an example, as shown in FIG. 8, the memory 802 may include, but is not limited to, a first display unit 702, a first obtaining unit 704, and a second display unit 706 in the image display apparatus. In addition, the memory may further include, but is not limited to, other module units in the image display apparatus. The other module units are not described in detail in this example.

In some embodiments, the electronic device further includes a transmission apparatus 806, the transmission apparatus 806 being configured to receive or transmit data through a network. A specific example of the above-mentioned network may include a wired network and a wireless network. In an example, the transmission apparatus 806 includes a network interface controller (NIC). The NIC may be connected to another network device and a router by using a network cable, to communicate with the Internet or a local area network. In an example, the transmission apparatus 806 is a radio frequency (RF) module that is configured to communicate with the Internet in a wireless manner.

In addition, the electronic device further includes: a display 808 configured to display information about the identifiers of the set of images, the first image and the first region; and a connection bus 810 configured to connect module components in the electronic device.

The embodiments of the present disclosure further provide a computer-readable storage medium, storing a computer program, the computer program being configured to perform, when run, the image display method provided by embodiments of the present disclosure.

In some embodiments, the computer-readable storage medium may be configured to store a computer program for performing the following operations:

S1: Display identifiers of a set of images in a game screen of a target game application, the set of images being images configured for a target virtual operation object and to be displayed in the game screen.

S2: Obtain a first operation in the target game application, the first operation being used for selecting an identifier of a first image among the identifiers of the set of images.

S3: Display the first image on a first region of the game screen.

A person of ordinary skill in the art may understand that all or some of the operations of the methods in the example embodiments may be implemented by a program instructing relevant hardware of the user equipment. The program may be stored in a computer-readable storage medium. The storage medium may include a flash disk, a read-only memory (ROM), a random access memory (RAM), a magnetic disk, an optical disk, and the like.

The sequence numbers of the above-mentioned embodiments of the present disclosure are merely for description purpose, and are not intended to indicate the preference among the embodiments.

When the integrated unit in the above-mentioned embodiments is implemented in a form of a software functional unit and sold or used as an independent product, the integrated unit may be stored in the above-mentioned computer-readable storage medium. Based on such an understanding, the technical solutions of the present disclosure essentially, or the part contributing to the related art, or the entire or some of the technical solutions may be implemented in a form of a software product. The computer software product is stored in a storage medium and includes several instructions for instructing one or more computer devices (which may be a personal computer, a server, a network device, or the like) to perform all or some of the operations of the methods described in the embodiments of the present disclosure.

In the above-mentioned embodiments of the present disclosure, the descriptions of the embodiments have their respective focuses. For a part that is not described in detail in an embodiment, refer to related descriptions in other embodiments.

In the several embodiments provided in the present disclosure, it is to be understood that, the disclosed client may be implemented in another manner. The described apparatus embodiment is merely exemplary. For example, the unit division is merely logical function division and may be other division during actual implementation. For example, a plurality of units or components may be combined or integrated into another system, or some features may be ignored or not performed. In addition, the coupling, or direct coupling, or communication connection between the displayed or discussed components may be the indirect coupling or communication connection by means of some interfaces, units, or modules, and may be electrical or of other forms.

The units described as separate components may or may not be physically separate, and components displayed as units may or may not be physical units, may be located in one location, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may be physically separated, or two or more units may be integrated into one unit. The integrated unit may be implemented in the form of hardware, or may be implemented in the form of a software functional unit.

The above-mentioned descriptions are merely exemplary implementations of the present disclosure. A person of ordinary skill in the art may make some improvements and polishing without departing from the principle of the present disclosure and the improvements and polishing shall fall within the protection scope of the present disclosure.

INDUSTRIAL APPLICABILITY

In the embodiments of the present disclosure, an electronic device displays identifiers of a set of images in a game screen of a target game application, the set of images being images configured for a target virtual operation object and to be displayed in the game screen; obtains a first operation in the target game application, where the first operation is used for selecting an identifier of a first image among the identifiers of the set of images; and displays the first image on a first region of the game screen. In this way, by configuring a set of images for the target virtual object to increase the flexibility of images that the target virtual object is allowed to display in the target game application, the target virtual object is no longer limited to displaying preset fixed images in the target game application, but can choose from more different images to be displayed on the first region, thereby increasing the diversity of the image display.

What is claimed is:

1. A method of displaying an image in an application, performed by an electronic device, the method comprising:
    displaying identifiers of a set of images in a first region of a game screen of a target game application, where the set of images are images that are used to customize a visualization of a target operation of a target virtual operation object and to be displayed in the game screen;
    obtaining a first operation on the first region of the game screen in the target game application, wherein the first operation is selection of an identifier of a first image among the identifiers of the set of images; and displaying the first image on a second region of the game screen, wherein the first image customizes the visualization of the target operation of the target virtual operation object in the second region of the game screen.

2. The method according to claim 1, wherein the displaying the first image on the second region of the game screen comprises:

displaying the first image on the second region at which a first aim point is aimed in the game screen, the first aim point being an aim point of a first virtual attack prop currently used by the target virtual operation object.

3. The method according to claim 2, wherein the displaying the first image on the second region at which the first aim point is aimed in the game screen comprises:

obtaining a first location at which the first aim point is aimed, the first location being a location at which the first aim point and a first static obstacle in the game screen are aligned; and displaying the first image on the second region comprising the first location.

4. The method according to claim 1, further comprising:

displaying the identifiers of the set of images in the game screen;

obtaining a second operation in the target game application, the second operation being used for selecting an identifier of a second image among the identifiers of the set of images;

selecting, in response to the second operation, the identifier of the second image among the identifiers of the set of images; and displaying the second image on the second region of the game screen, and canceling the display of the first image on the second region of the game screen.

5. The method according to claim 4, wherein the displaying the second image on the second region of the game screen comprises:

displaying the second image on the second region at which a second aim point is aimed in the game screen, the second aim point being an aim point of a second virtual attack prop currently used by the target virtual operation object.

6. The method according to claim 5, wherein the displaying the second image on the second region at which the second aim point is aimed in the game screen comprises:

obtaining a second location at which the second aim point is aimed, the second location being a location at which the second aim point and a second static obstacle in the game screen are aligned; and displaying the second image on the second region comprising the second location.

7. The method according to claim 1, further comprising, prior to the displaying the identifiers of the set of images in the game screen:

displaying an image list on a configuration interface of the game screen, the image list comprising identifiers of a plurality of images;

obtaining a third operation in the target game application, the third operation being used for selecting the identifiers of the set of images among the identifiers of the plurality of images; and selecting, in response to the third operation, the identifiers of the set of images among the identifiers of the plurality of images, and configuring the set of images for the target virtual operation object.

8. An image display apparatus, comprising:

at least one memory configured to store program code; and at least one processor configured to read the program code and operate as instructed by the program code, the program code comprising:

first displaying code configured to cause the at least one processor to display identifiers of a set of images in a first region of a game screen of a target game application, wherein the set of images are images that are used to customize a visualization of a target operation of a target virtual operation object and to be displayed in the game screen;

first obtaining code configured to cause the at least one processor to obtain a first operation on the first region of the game screen in the target game application, wherein the first operation is selection of an identifier of a first image among the identifiers of the set of images; and second displaying code configured to cause the at least one processor to display the first image on a second region of the game screen, wherein the first image customizes the visualization of the target operation of the target virtual operation object in the second region of the game screen.

9. The apparatus according to claim 8, wherein the second displaying code is further configured to cause the at least one processor to:

display the first image on the second region at which a first aim point is aimed in the game screen, the first aim point being an aim point of a first virtual attack prop currently used by the target virtual operation object.

10. The apparatus according to claim 9, wherein the first displaying code is further configured to cause the at least one processor to:

obtain a first location at which the first aim point is aimed, the first location being a touch location at which the first aim point touches a first static obstacle in the game screen; and display the first image on the second region comprising the first location.

11. The apparatus according to claim 8, further comprising:

third displaying code configured to cause the at least one processor to display the identifiers of the set of images in the target game application after the first image is displayed on the second region of the game screen;

second obtaining code configured to cause the at least one processor to obtain a second operation in the target game application after the first image is displayed on the second region of the target game application, the second operation being used for selecting an identifier of a second image among the identifiers of the set of images;

first selecting code configured to cause the at least one processor to select, in response to the second operation, the identifier of the second image among the identifiers of the set of images; and fourth displaying code configured to cause the at least one processor to display the second image on the second region of the game screen, and cancel the display of the first image on the second region of the game screen.

12. The apparatus according to claim 11, wherein the fourth displaying code is further configured to cause the at least one processor to:

display the second image on the second region at which a second aim point is aimed in the game screen, the second aim point being an aim point of a second virtual attack prop currently used by the target virtual operation object.

13. The apparatus according to claim 12, wherein the second displaying code is further configured to cause the at least one processor to:
obtain a second location at which the second aim point is aimed, the second location being a location at which the second aim point and a second static obstacle in the game screen are aligned; and
display the second image on the second region comprising the second location.

14. The apparatus according to claim 8, wherein prior to the first displaying code, the program code comprises:
fifth displaying code configured to cause the at least one processor to display an image list on a configuration interface of the game screen, the image list comprising identifiers of a plurality of images;
third obtaining code configured to cause the at least one processor to obtain a third operation in the target game application, the third operation being used for selecting the identifiers of the set of images among the identifiers of the plurality of images; and
second selecting code configured to cause the at least one processor to select, in response to the third operation, the identifiers of the set of images among the identifiers of the plurality of images, and configuring the set of images for the target virtual operation object.

15. A non-transitory computer-readable storage medium, storing a program, the program being executable by at least one processor to perform:
displaying identifiers of a set of images in a first region of a game screen of a target game application, wherein the set of images are images that are used to customize a visualization of a target operation of a target virtual operation object and to be displayed in the game screen;
obtaining a first operation on the first region of the game screen in the target game application, wherein the first operation being is selection of an identifier of a first image among the identifiers of the set of images; and
displaying the first image on a second region of the game screen, wherein the first image customizes the visualization of the target operation of the target virtual operation object in the second region of the game screen.

16. The non-transitory computer-readable storage medium of claim 15, wherein the displaying the first image on the second region of the game screen comprises:
displaying the first image on the second region at which a first aim point is aimed in the game screen, the first aim point being an aim point of a first virtual attack prop currently used by the target virtual operation object.

17. The non-transitory computer-readable storage medium of claim 16, wherein the displaying the first image on the second region at which the first aim point is aimed in the game screen comprises:
obtaining a first location at which the first aim point is aimed, the first location being a location at which the first aim point and a first static obstacle in the game screen are aligned.

18. The non-transitory computer-readable storage medium of claim 15, the program being executable by the at least one processor to further perform:
displaying the identifiers of the set of images in the game screen;
obtaining a second operation in the target game application, the second operation being used for selecting an identifier of a second image among the identifiers of the set of images;
selecting, in response to the second operation, the identifier of the second image among the identifiers of the set of images; and
displaying the second image on the second region of the game screen, and canceling the display of the first image on the second region of the game screen.

19. The non-transitory computer-readable storage medium of claim 18, wherein the displaying the second image on the second region of the game screen comprises:
displaying the second image on the second region at which a second aim point is aimed in the game screen, the second aim point being an aim point of a second virtual attack prop currently used by the target virtual operation object.

20. The non-transitory computer-readable storage medium of claim 15, wherein prior to the displaying the identifiers of the set of images in the game screen, the program being executable by the at least one processor to perform:
displaying an image list on a configuration interface of the game screen, the image list comprising identifiers of a plurality of images;
obtaining a third operation in the target game application, the third operation being used for selecting the identifiers of the set of images among the identifiers of the plurality of images; and
selecting, in response to the third operation, the identifiers of the set of images among the identifiers of the plurality of images, and configuring the set of images for the target virtual operation object.

* * * * *